(12) United States Patent
Müller

(10) Patent No.: US 8,911,651 B2
(45) Date of Patent: Dec. 16, 2014

(54) METHOD FOR PRODUCING A LEAF SPRING AS A FIBER COMPOSITE COMPONENT, AND A LEAF SPRING

(75) Inventor: Ulrich Müller, Langweid am Lech (DE)

(73) Assignee: Benteler SGL GmbH & Co. KG, Paderborn (DE)

( * ) Notice: Subject to any disclaimer, the term of this patent is extended or adjusted under 35 U.S.C. 154(b) by 277 days.

(21) Appl. No.: 13/406,158

(22) Filed: Feb. 27, 2012

(65) Prior Publication Data
US 2013/0056900 A1    Mar. 7, 2013

(30) Foreign Application Priority Data

Feb. 28, 2011  (DE) .......................... 10 2011 012 654

(51) Int. Cl.
| | |
|---|---|
| B29C 45/14 | (2006.01) |
| B29C 45/02 | (2006.01) |
| B29C 70/48 | (2006.01) |
| F16F 1/368 | (2006.01) |
| B60G 5/03 | (2006.01) |
| B29L 31/00 | (2006.01) |
| B29B 11/16 | (2006.01) |

(52) U.S. Cl.
CPC ............. *B29C 70/48* (2013.01); *B29L 2031/74* (2013.01); *B29B 11/16* (2013.01); *F16F 1/368* (2013.01)
USPC .......................................... 264/258; 264/279

(58) Field of Classification Search
CPC ...... B29C 45/02; B29C 70/465; B29C 45/14; B29C 70/46; B29C 70/70345; B29C 70/48
USPC .......................................................... 264/258
See application file for complete search history.

(56) References Cited

U.S. PATENT DOCUMENTS

| | | | | |
|---|---|---|---|---|
| 3,036,975 A | * | 5/1962 | Taub ............................. | 528/116 |
| 4,133,708 A | * | 1/1979 | Tokuno ........................ | 156/179 |

(Continued)

FOREIGN PATENT DOCUMENTS

| | | |
|---|---|---|
| DE | 34 34 522 A1 | 3/1986 |
| DE | 199 22 799 A1 | 11/2000 |

(Continued)

OTHER PUBLICATIONS

M. Perruchot: "Les ressort en matériaux composites", in: Revue Technique Diesel, Boulogne Billancourt, France, Sep. 1991, pp. 23-26.

(Continued)

*Primary Examiner* — Matthew Daniels
(74) *Attorney, Agent, or Firm* — Henry M. Feiereisen LLC.

(57) ABSTRACT

A leaf spring for a motor vehicle is made from a fiber composite component including individual fibers in form of at least two textile layers stacked on top of each other and a matrix made of a duroplastic or thermoplastic resin surrounding the fibers. The resin is hardened in a mold tool by applying pressure and heat. The stacked textile layers are formed inside a mold tool and fixed by a dry binder applied to at least one of the textile layers to form a dry preform. A fiber composite blank is stamped from the preform and subsequently infiltrated with the resin in a RTM cavity and hardened. The binder applied in dry form may only be arranged in certain areas of the textile layers.

9 Claims, 2 Drawing Sheets

(56) References Cited

U.S. PATENT DOCUMENTS

| | | | |
|---|---|---|---|
| 4,862,780 A * | 9/1989 | Memmott et al. | 83/128 |
| 5,080,851 A * | 1/1992 | Flonc et al. | 264/258 |
| 5,118,373 A * | 6/1992 | Krummenacher | 156/175 |
| 6,472,462 B1 | 10/2002 | Kohlhammer et al. | |
| 2003/0214081 A1 | 11/2003 | Ockers | |
| 2004/0070109 A1 | 4/2004 | Palinsky et al. | |
| 2005/0086916 A1 | 4/2005 | Caron | |
| 2007/0241478 A1 | 10/2007 | Buckley | |
| 2009/0011063 A1 * | 1/2009 | Davie et al. | 425/144 |
| 2009/0074905 A1 * | 3/2009 | Matsen et al. | 425/547 |

FOREIGN PATENT DOCUMENTS

| | | |
|---|---|---|
| DE | 199 59 415 | 6/2001 |
| DE | 101 61 773 A1 | 6/2003 |
| DE | 103 21 824 | 12/2003 |
| DE | 10 2006 052 137 A1 | 5/2008 |
| EP | 0 272 635 | 6/1988 |
| EP | 1 375 591 | 1/2004 |
| GB | 2 233 275 A | 1/1991 |
| JP | H 04-316811 | 11/1992 |

OTHER PUBLICATIONS

Langdon et al.: "Materials Plastics and Composites", in: Automotive Engineer, vol. 22, No. 2, Mar. 1997, pp. 30-39.

C.D. Rudd: "Resin transfer molding and structural reaction injection molding", in: ASM Handbook Composites, vol. 21, Dec. 2001, pp. 492-500.

M.B. Hennissen: "Automotive applications of epoxy resin transfer moulding", in: Ingenieurs de l'Automobile, vol. 722, Jun. 1998, entire document.

Guillermin: "Computer-Aided Design and Manufacturing", in: Composites, Dec. 2001, pp. 366-372.

Campbell et al.: "Manufacturing processes for advanced composites, passage", in: Elsevier Advanced Technology, Oxford, GB, Jan. 2004, pp. 331-341.

* cited by examiner

METHOD FOR PRODUCING A LEAF SPRING AS A FIBER COMPOSITE COMPONENT, AND A LEAF SPRING

CROSS-REFERENCES TO RELATED APPLICATIONS

This application claims the priority of German Patent Application, Serial No. 10 2011 012 654.6, filed Feb. 28, 2011, pursuant to 35 U.S.C. 119(a)-(d), the content of which is incorporated herein by reference in its entirety as if fully set forth herein.

BACKGROUND OF THE INVENTION

The present invention relates to a method for producing a leaf spring as a fiber composite component for a motor vehicle as well as to a leaf spring produced with the method.

The following discussion of related art is provided to assist the reader in understanding the advantages of the invention, and is not to be construed as an admission that this related art is prior art to this invention.

Composite materials have better mechanical properties compared to the combined components themselves. The interactions that occur when the at least two major components are joined allow an almost perfect uptake of the internal forces produced when a load is applied to component made from a composite material. In particular fiber composite materials have an advantageously high strength per weight and the components produced therefrom have high stiffness. Starting materials are artificial or natural fibers which are processed either individually or as a fiber bundle (roving) as well as a two-dimensional textile structure. Components which can be almost universally applied and which are able to withstand high loads can be produced in combination with a matrix made of a hardening resin surrounding the individual fibers. The conventional manufacturing processes are based on using fibers impregnated with a resin, wherein the fibers are combined in a mold tool into a fiber composite component by applying pressure and heat.

Conventionally, the individual fibers in form of a fiber strand are first wetted with a not yet set plastic matrix, which penetrates and hence infiltrates the fiber strand when exposed to heat. The premature reaction of the resin is prevented by subsequent cooling, whereafter the infiltrated fiber strand is cut to length into individual prepregs. The individual prepregs are layered on top of one another in a shaping mold tool and hardened by applying pressure and heat. The finished leaf spring is produced in a subsequent finishing step.

The necessary measures for infiltrating and cooling the fiber strand are complex. In particular, cooling must be maintained until shortly before the prepegs are used so as to retain the binding properties of the resin. In addition, the prepegs with the not yet set resin are difficult to handle. Layering the sticky prepegs also requires a high degree of precision in order to ensure that the prepegs are as congruent as possible and have few air inclusions.

In particular, layering therefore requires an increased expenditure of time. Moreover, attention should also be paid to the end regions of the component so as to prevent notch effects or exposed ends of the fibers, which could weaken the fiber composite component and hence shorten its service life.

In view of this background, there is still room for improvements to make industrial production of springs in form of fiber composite materials more economical.

It would therefore be desirable and advantageous to obviate prior art shortcomings and to provide an improved method for producing a leaf spring as a fiber composite component for a motor vehicle by simplifying handling of the fibers infiltrated with resin and making the overall production process more economical. It would also be desirable and advantageous to provide a leaf spring produced with this method, which can be manufactured with higher precision particularly in its edge and end regions in spite of the more economical manufacturing process.

SUMMARY OF THE INVENTION

According to one aspect of the present invention, a method for producing a leaf spring in form of a fiber composite component for a motor vehicle includes the steps of layering fibers in form of at least two textile layers on top of one another, shaping the textile layers inside a mold tool, applying a binder in dry form on at least one of the textile layers and fixing the textile layers so as to form a dry preform, infiltrating the preform with resin in an RTM (Resin Transfer Molding) cavity, and hardening the resin to produce the leaf spring of individual fibers and a matrix formed of hardened resin surrounding the fibers.

The resin is hardened inside the RTM cavity at least until the fiber composite component to be removed from the RTM cavity attains a loadable hardness. The obtained hardness of the resin is at least adequate to prevent plastic deformations in subsequent handling of the fiber composite component.

Advantageously, the fibers may be handled dry during the entire process. The fiber fabric is actually infiltrated only after placement inside the RTM cavity, from which the initially liquid resin is removed in dry form as a fiber composite component. Because impregnation and cool storage of the impregnated textile layers are eliminated, the impregnated textile layers are moved outside the tools as a preform only when dry; this significantly facilitates their handling.

According to an advantageous feature of the present invention, the binder used to fix the shape of the individual textile layers in the preform already conforming to the final shape of the leaf spring may be applied in dry form. The dry preforms produced in this manner may be stored and moved without special requirements regarding the ambient temperature or the hold-over time.

According to an advantageous feature of the present invention, depending on the intended application, the binder may only be applied to the textile layer in certain areas. Advantageously, the binder may be applied on a surface of the textile layer referred to as top side when the layers are stacked. The binder may, for example, be provided in powder form or as a granulate material disposed on the top side of the textile layer. The binder may not have to be applied on one side of the textile layers, for example the topmost textile layer, because this textile layer already rests on the textile layer underneath and hence on the top surface of the textile layer underneath having the binder.

With the binder, at least individual fibers of the textile layers may be partially bonded through adhesive or cohesive forces.

With the binder, the superpositioned textile layers are at least partially glued to each other. The binder may be applied on the individual textile layers either through contact or contactless.

The binder may be applied, for example, by spreading, spraying or rolling.

According to an advantageous feature of the present invention, the binder may be applied on individual textile layers. Advantageously, the binder may be first applied on a textile web from which the individual textile layers are cut. The binder may basically be applied over the entire surface of the textile web or only in certain areas of the textile web. The manner of the application depends on the shape to be produced, wherein flat regions remain stable even with only a local application, whereas topographically demanding shapes require a full area application.

The individual regions may also be provided with different quantities of binder. In addition, the application may be based on a single binder or on different binders, wherein the different binders are applied to specific areas of the textile web. For example, different strengths can then be adapted to the local requirements.

The individual textile webs may have a uniform contour. However, the individual textile webs may also have contours that are different from each other, wherein local protrusions or indentations of the entire textile stack may be adjusted just by layering the different textile webs.

According to an advantageous feature of the present invention, regions of the finished fiber composite component can be produced with different thickness by placing, for example, a narrower textile web in a center region of an adjacent textile web, thereby thickening the center region of the fiber composite component. Alternatively, textile webs having already different thicknesses may be used. The thicker textile webs may hereby have fibers that cross each other multiple times or fibers with a larger diameter.

The individual textile layers may essentially have the structure of a fabric or of a mat. The textile layers made of a fabric or of a mat can also be combined with each other for producing the fiber composite component. In mats, the textile layers preferably include fiber rovings arranged in parallel, wherein the individual layers differ from each other in their respective fiber orientation. The individual layers may be connected to each other.

The textile layers in form of a fabric are typically two-dimensional textile structures, which have at least two fiber systems that cross each other at right angles or have different orientations.

The employed textile web may be in form of a single layer or multiple layers, so that the textile layers separated from this textile web may be used directly as multiple layers, or separated into the individual layers and then provided with the binder and stacked.

According to an advantageous feature of the present invention, the binder which is at least partially arranged between individual textile layers may be melted inside the mold tool by heating. Advantageously, the binder may be applied initially in dry form. Handling is simplified because the binder is dry and has in this context a non-stick consistency. Any excess material can be easily removed from the adjoining components or surfaces of the employed tools and spaces. The actual adhesive properties are activated only when the binder is re-activated in the presence of heat.

According to an advantageous feature of the present invention, the mold tool may include at least one temperature control device for heating and melting the binder. The binder can hereby also be melted locally, with the temperature control device heating the binder only partially. The binder may also be heated successively, whereby specific regions are heated sequentially. Successive heating occurs preferably when the textile layers are shaped, allowing individual regions, in particular regions with complex spherical shapes, to slide past one another and become aligned, without being hindered by the melted binder. Such regions are preferably heated with the temperature control device only after there are shaped, whereby the binder is hereby also melted and the textile layers are fixed to one another.

Depending on the type of the employed binder, the preform may be actually fixed also by cooling the melted binder. To this end, the binder is after melting either cooled over the entire area or locally in specific areas, whereby the binder is at least partially fixed, joining the textile layers to each other. Like the heating process, cooling can also be performed successively and depending on the respective shape of the preform.

According to an advantageous feature of the present invention, a fiber composite blank may be separated, in particular stamped, from the produced preform. In general, the fiber composite blank may also be separated from the preform by other separation measures, for example, by multi-stroke cutting along the contour of the fiber composite blank. Stamping also enables a very economical and precise separation of the fiber composite blank from the preform which may, however, also be done using other mechanical tools or, for example, thermal separation methods (e.g., the electric arc, laser).

The fiber composite blank separated from the preform has a very precise contour which is independent of the congruency of the fiber ends previously achieved when the textile layers were stacked and shaped. In combination with the shape already achieved in the preform, the fiber composite blank has consistently high quality with respect to the orientation and contouring of the textile layers, and specifically of the individual fibers.

According to an advantageous feature of the present invention, the fiber composite blank separated from the preform may be infiltrated with the resin in the RTM cavity and hardened. Due to the precise contouring of the fiber composite blank, the fiber composite blank can be positioned very precisely inside the RTM cavity, so that individual and uniform edge distances of the fiber and fiber ends to the final shape of the leaf spring can be maintained.

Advantageously, the RTM cavity is a closed, in particular solid tool, where the fiber composite blank is infiltrated with resin during a Resin Transfer Molding (RTM) process and hardened. The resin is hereby injected into the closed RTM cavity, specifically into its shaping region (cavity), under pressure and hardened by applying heat and pressure.

The resin may be introduced into the RTM cavity under high pressure, so that the fiber composite blank consisting of the individual textile layers is completely infiltrated with the resin. The individual fibers are here embedded into a matrix made from the duroplastic or thermoplastic resin, whereafter the actual hardening process can take place.

To prevent potential air inclusions in the cavity of the shaping region, this region may be evacuated ahead of time. Due to the reduced atmospheric pressure inside the shaping region, the resin can also be transported into the higher regions of the cavity, filling the entire cavity with resin. In combination with the applied pressure, the resin is thus pressed and/or suctioned into all regions of the cavity.

According to an advantageous feature of the present invention, the resin may be injected at the center of the RTM cavity. By injecting the resin into the cavity at the cavity's center, all regions of the fiber composite blank are uniformly infiltrated with the resin.

Because the fiber composite blank was separated from the preform before making contact with the resin, exposed or even truncated fibers are absent in the fiber composite component after the resin has hardened. The ends of the fibers which are exposed when the fiber composite blank is separated are completely covered by the resin, protecting them from possible stress and damage shortening the service life of the fiber composite component.

According to an advantageous feature of the present invention, the fiber composite blank may be tempered inside the RTM cavity at locally different temperatures. In addition, the fiber composite blank may be tempered inside the RTM cavity with locally changing temperatures. When tempering the fiber composite blank with locally changing temperatures, predetermined temperature curves can be executed inside the RTM cavity, allowing hardening of individual regions without stress. Tempering can in principle apply to both heating and cooling.

According to an advantageous feature of the present invention, the fiber composite blank may be actively cooled inside the RTM cavity after the resin has hardened. However, the fiber composite blank cooling may also be cooled outside the RTM cavity.

According to an advantageous feature of the present invention, the already infiltrated and hardened fiber composite blank may be heated at least partially outside the RTM cavity by a heat source to a temperature from 80° C. to 200° C. The already infiltrated and hardened fiber composite blank may particularly be heated to a temperature from 120° C. to 130° C. Subsequent heating is intended to fully harden the resin. Heating may be performed, for example, in a tempering furnace by heating one or several of the already infiltrated and pre-hardened fiber composite blanks. Heating may essentially also performed with other heat sources capable of at least partially heating the already infiltrated and pre-hardened fiber composite blank with or without making contact. Tempering may be performed, for example, also with infrared radiation, microwaves or induction in combination with ferromagnetic materials.

Depending on the requirements, the produced component may subsequently be machined. For example, specific regions can be machined with a manual or automatic grinding process.

According to an advantageous feature of the present invention, the individual fibers of the textile layers or the textile layers themselves may be formed from different materials already when the individual textile layers are stacked. For example, at least some of the textile layers may be formed, for example, from glass fibers or carbon fibers. In addition, at least one of the textile layers may be formed from ceramic fibers, aramide fibers or boron fibers as well as from natural fibers or nylon fibers. Individual fibers of the textile layers may be specific to the formed from a material that is different from the material of the adjacent fibers, for example from a glass or carbon fiber. Individual fibers made from ceramic fiber, aramide fiber or born fiber as well as from natural fiber or nylon fiber may also be used. In general, at least one fiber may also be formed of metal or one of the textile layers may be formed from metallic fibers.

Advantageously, the resin may be injected in the center of the RTM cavity. Advantageously, the resin is hereby uniformly distributed inside the cavity, causing a complete infiltration of the individual textile layers. Because the respective end regions have the same distance inside the cavity, the resin can be uniformly distributed without any air inclusions.

According to an advantageous feature of the present invention, different temperature levels may be applied for hardening and/or cooling. Corresponding temperature levels may already be used in the mold tool. In addition, different temperature levels may also be applied in the RTM cavity. As a result, the entire production process and the respective handling during the production can be simplified.

The method according to the invention illustrates a very economical way for producing a leaf spring as a fiber composite component for a motor vehicle, which significantly simplifies handling of the fibers infiltrated with a resin. All processes relating to the not yet set resin take place inside a closed system, particularly inside the RTM cavity, thus eliminating the complexity of handling and storing the already infiltrated fibers.

By producing a preform in which the individual textile layers are initially fixed to each other with a binder, the individual fibers can first be positioned and shaped outside the contact region with the resin. When producing the preform, it is not absolutely necessary to congruently layer the individual textile layers, because the actual fiber composite blank which is to be embedded in the matrix made of the duroplastic or thermoplastic resin is first separated from the preform. The separation from the preform produces very clean and exact edge regions, independent of the initial care taken with respect to layering of the individual textile layers.

According to another aspect of the invention, a leaf spring for a motor vehicle includes at least two textile layers made of fibers, a dry binder arranged at least partially between the least two textile layers, and a matrix formed of a hardened resin surrounding the fibers.

The binder may be a material different from the resin. In general, the binder may also be a material identical to the resin, although the binder may in this case have molecular chains of different lengths. Due to the different lengths of the molecular chains, the binder has different properties from the resin depending on the respective temperature. The binder is provided to fix the textile layers with respect to one another before the textile layers are infiltrated with the resin. The resin itself is hardened in an RTM cavity.

The ends of the individual fibers may be completely embedded in the resin. The edge regions of the individual textile layers, specifically the ends of the fiber, have an at least partially uniform distance from the outside contour of the fiber composite component proximate to the edge. Even if the fiber composite component is partially machined, the machined ends do not show any open ends of the fibers.

According to an advantageous feature of the present invention, at least 90% of the fibers arranged in the fiber composite component may be oriented in the longitudinal direction of the leaf spring. Alternatively, approximately 95% of the fibers in the leaf spring may be oriented in its longitudinal direction. Preferably, approximately 99% of the fibers arranged in the leaf spring may be oriented in its longitudinal direction. The fibers that are not oriented in the longitudinal direction of the fiber composite component may extend, for example, in the crosswise direction.

The fraction of the fibers oriented crosswise to the longitudinal direction of the leaf spring may be from 0% to 2% of the weight per unit area of a textile layer. The leaf spring may have only unidirectional textile layers when the leaf spring is loaded only in one direction. The individual fibers may hereby be arranged in the form of rovings, which are only oriented in the direction of the load. The transverse fibers arranged crosswise to the major direction stabilize the fibers that are oriented in the longitudinal direction. The material of the longitudinal and transverse fibers may also be different from each other. Individual fibers may be formed, for example, from glass fibers or carbon fibers. In addition, individual fibers may also be formed from ceramic fibers, aramide fibers or boron fibers, as well as from natural fibers and nylon fibers. In addition, for example, yarns, metal fibers or thermoplastic fibers may be used as fibers. When only stabilization is required, the transverse fiber may be formed from a weaker material compared to the longitudinal fiber. In particular in the presence of higher transverse tension stress, the transverse fibers may also be formed from a material able to withstand higher tension stress.

The leaf spring has as a fiber composite component in its cross-section a fiber fraction of 50% to 70%. In general, the fiber fraction within the cross-section of the fiber composite component may be 55% to 65%. Preferably, the fiber composite component has in cross-section a fiber fraction of 59% to 63%. Increased tension forces can be absorbed with an increased fiber fraction within the fiber composite component constructed to absorb the tension stress. In components stressed by bending, in particular in a leaf spring, the fiber fraction in cross-section of the fiber composite component may advantageously be arranged in the edge region of the final bending shape, with the individual fibers absorbing the tension forces and the resin absorbing the compression forces on the opposite side.

According to an advantageous feature of the present invention, at least one of the fibers may be formed from a different material. Fundamentally, the individual fibers and fiber bundles (rovings) or the individual textile layers may be formed from different materials. Individual fibers may be formed, for example, from glass fibers or carbon fibers. In addition, fibers may also be formed from ceramic fibers, aramide fibers or boron fibers as well as from natural fibers or nylon fibers. In addition, at least one fiber may also be formed from a metal.

With the invention, a fiber composite component can be produced within a very short time and with high precision, wherein the fiber composite component lacks flaws caused by potentially exposed ends of the fibers. The individual fibers are protected from mechanical loads because the individual fibers must be separated from the edge regions of the fiber composite component. Machining the fiber composite component does not expose any individual fibers due to the controlled separation from the edge.

The finished leaf spring and the tools relating to its manufacture may have the geometries commensurate with the respective application and use. For example, the finished leaf spring may have isolated variations in the cross-section, which extend over its length and height and/or width. In particular, regions supporting a higher load may specifically have a larger cross-sectional area for improved absorption of the applied forces.

For a specified installation of the finished leaf spring, the respective ends of the leaf spring may have bearing eyes. The bearing eyes may be formed, for example, as a single piece on the fiber composite component itself. In general, the bearing eyes may also be provided as a preformed component which is incorporated in the fiber composite component when the leaf spring is manufactured.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
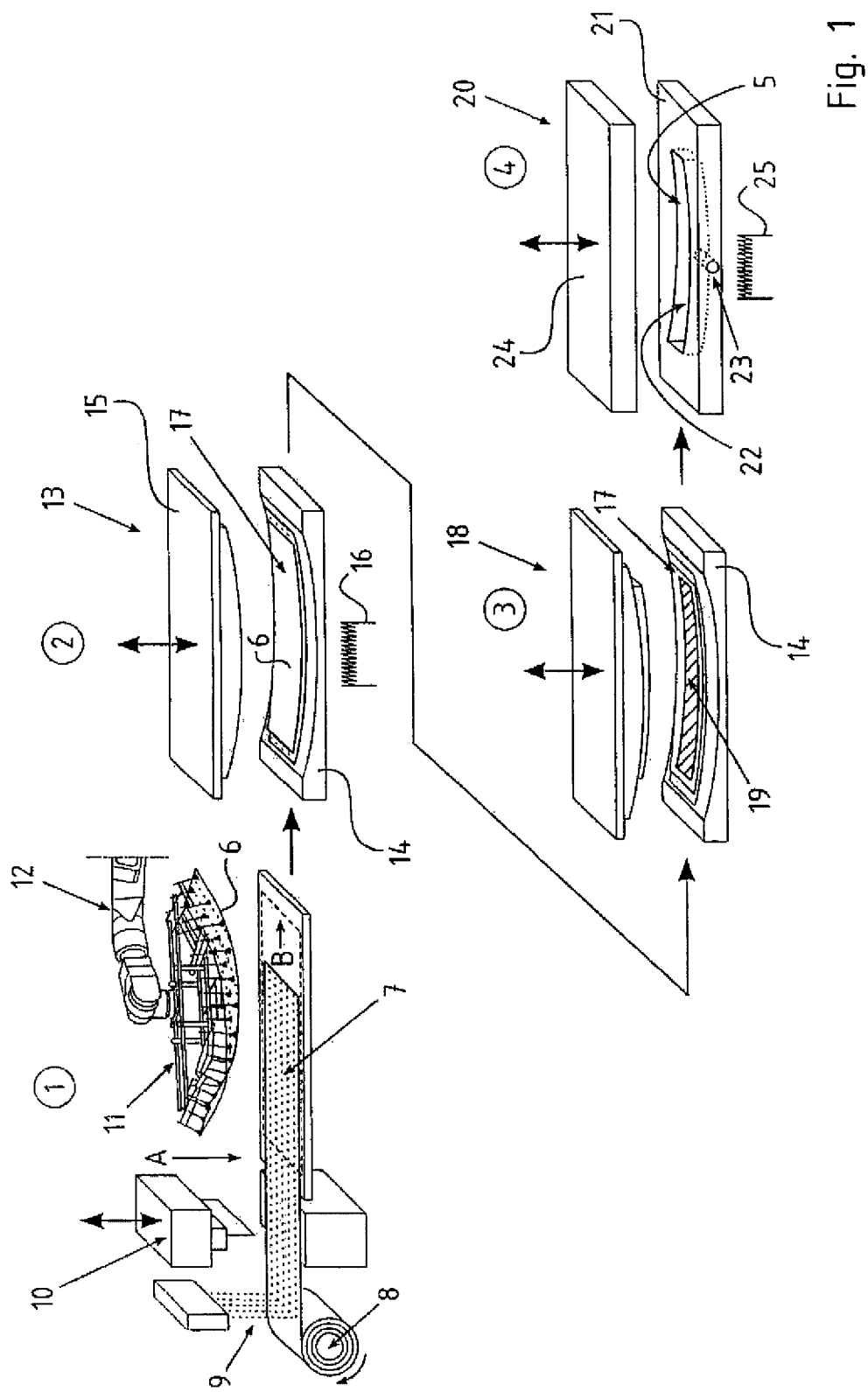
FIG. 1 shows a schematic process flow diagram for producing a fiber composite component according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there are shown four stations 1-4 that characterize a process for producing a leaf spring 5 as a fiber composite component. At station 1, individual fibers are provided in form of individual textile layers 6. The textile layers 6 are separated from a textile web 7 which is unwound from a textile roller 8. A binder 9 is applied while the textile web 7 is unwound. The binder 9 is applied to the top side A of the textile web 7 in dry form, whereafter the textile web 7 with the binder 9 passes underneath a separation device 10 in a transport direction B, wherein the separation device 10 cuts the textile web 9 to length into textile layers 6 with the applied binder 9. The separated textile layers are individually picked up with a vacuum gripper 11 which is connected to a manipulator 12 in form of a robot arm. The vacuum gripper 11 is constructed such that the picked-up textile layer 6 is already bent commensurate with the shaping area of a mold tool 13.

The picked-up textile layer 6 is rotated with the manipulator 12 of the following station 2 into the mold tool 13 and placed on a first mold bottom part 14 of the mold tool 13. Depending on the component to be produced, several textile layers 6 are layered on top of each other on the first mold bottom part 14. When the required number of textile layers 6 is reached, the mold tool 16 is closed. The stacked textile layers 6 are then compressed between the first mold bottom part 14 and a first mold top part 15. The textile layers 6 and the binder 9 connected with the textile layers 6 are heated with a first tempering device 16 that is integrated in the mold tool 13. The temperature can, for example, be between 80° C. and 130° C. The binder 9 is hereby melted inside the mold tool by heating.

The individual textile layers 6 are joined to each other by the melted binder 9 and glued together to form a preform 17. The preform 17 has already a shape resembling the finished leaf spring 5. When the binder 9 is melted inside the mold tool 13, the individual textile layers 6 are affixed to one another by cooling the melted binder 9. Cooling reduces the temperature level from a high temperature required for melting to a lower temperature, for example 60° C. The temperature required for melting is, for example, between 80° C. and 130° C. Cooling is hereby also performed with the first temperature control device 16 which is integrated in the mold tool 13.

The obtained preform 17 is subsequently transferred to station 3. The preform 17 is hereby moved inside the first tool bottom part 14 underneath a stamping tool 18 which separates a precisely contoured fiber composite blank 19 from the preform 17. The fiber composite blank 19 is separated from the preform 17 by stamping.

The produced fiber composite blank 19 is then transferred to station 4 which has an RTM cavity 20. The fiber composite blank 19 is then removed from the first mold bottom part 14 and inserted in a second mold bottom part 21 of the RTM cavity 20. The fiber composite blank 19 is hereby inserted in a cavity 22 of the second mold bottom part 21 which can be filled with an unillustrated resin through a fill opening 23 arranged centrally in the second mold bottom part 21.

The leaf spring 5 is then produced by closing the RTM cavity 20, wherein the fiber composite blank 19 inserted in the cavity 22 is enclosed between the second mold bottom part 21 and a second mold top part 24 of the RTM cavity 20. The resin is then pressed into the cavity 22, while a second temperature control device 25 heats the RTM cavity 20. The temperature in the RTM cavity 20 can be locally controlled with the second temperature control device 25, wherein the temperature may also be successively controlled locally across separate regions of the cavity 22.

Preferably, a vacuum is produced by evacuating the cavity 22. The resin is filled into the RTM cavity 20 under high pressure, until the second mold top part 24 is lifted. At this moment, the entire cavity 22 and particularly all textile layers 6 of the fiber composite blank 19 are infiltrated with the resin. Thereafter, hardening takes place under corresponding pressing pressure and temperature.

The leaf spring 5 to be removed from the RTM cavity 20 is heated at least partially outside the RTM cavity 20 by an unillustrated heat source to a temperature of 80° C. to 200° C., in particular to a temperature of 120° C. to 130° C. so as to completely harden. The resin is hereby fully hardened. The hardened leaf spring 5 can then be machined in a manner that is not described in detail.

Figure 2:
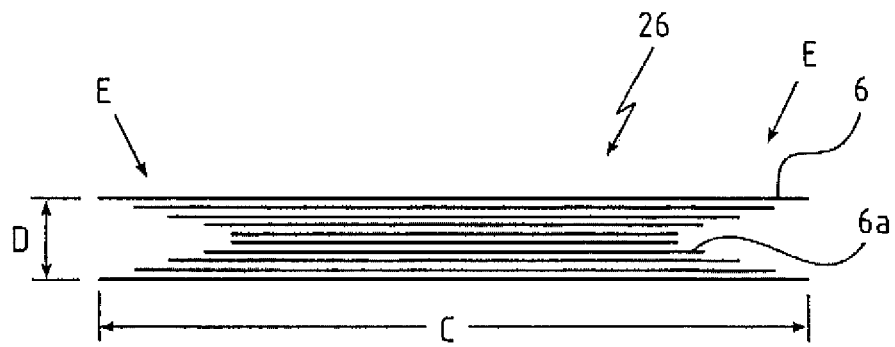
FIG. 2 shows a textile layer stack in a side view.

FIG. 2 shows a textile layer stack 26 in a side view. The textile layers 6 are stacked together with additional textile layers 6a, wherein the textile layers 6, 6a have different length. Depending on the design of the leaf spring 5 to be produced, the individual textile layers 6, 6a are first provided in a corresponding length C and width. The lengths C may be, for example, 2000 mm, whereas the widths may be, for example, 600 mm. The individual textile layers 6, 6a are stacked to a height D of, for example, 30 to 80 individual layers.

In the illustrated example, the finished leaf spring 5 has tapered ends E due to the shorter textile layers 6a disposed between the textile layers 6. With this design, supports which integrate the leaf spring 5 in an unillustrated motor vehicle may be arranged for example on the ends E. According to the example illustrated in FIG. 2, various shapes with respect to tapers or thickening are also possible in the regions between the ends E by varying the respective length C and the number of stacked textile layers 6, 6a.

Figure 3:
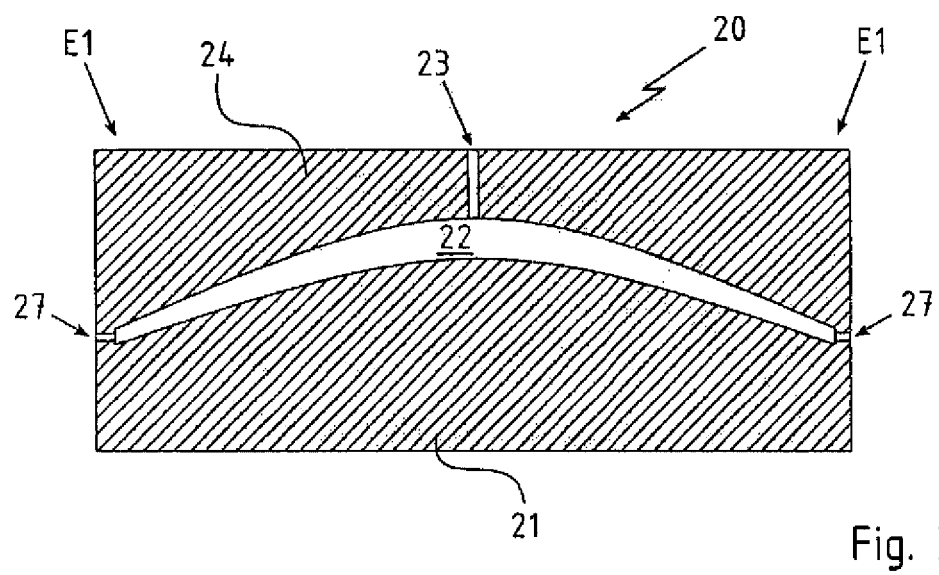
FIG. 3 shows a mold tool in cross-section.

FIG. 3 shows a cross-section through the RTM cavity 20 formed by the second mold bottom part 21 and the second mold top part 24. The two mold parts 21, 24 together forms a cavity 22. The cavity may have, as illustrated, for example a curved shape tapering to the ends E1. Outlet openings 27 which pass through the RTM cavity 20 from the outside and terminate in the cavity 22 are arranged in the region of the ends E1. The fill opening 23 disposed between the outlet openings 27 is arranged at the center of the curved cavity 22; the resin is pressed into the cavity 22 through the fill opening 23.

To perform the Resin Transfer Molding (RTM) process, the unillustrated fiber composite blank of FIG. 1 is inserted in the cavity 22 and enclosed by the second mold bottom part 21 and the second mold top part 24 of the RTM cavity 20. The resin is a duroplastic or a thermoplastic material which is pressed under high pressure into the cavity 22 through the fill opening 23. The fill opening 23 is specifically arranged in the center region of the RTM cavity 20 so as to ideally distribute the resin, thereby infiltrating all textile layers 6, 6a.

The preferred pressure for injecting the resin into the RTM cavity 20 is between 80 bar and 100 bar, wherein the RTM cavity 20 is heated by an unillustrated second temperature control device 25 of FIG. 1 to a constant temperature of 80° C. At this temperature, the resin has its highest viscosity, whereby different temperatures and pressures may be selected for other resins.

The resin is injected until it exits from the outlet openings 27 of the RTM cavity 20. At this time, the textile layers 6, 6a are thoroughly impregnated with the resin inside the cavity 22. The outlet openings 27 are then closed. Subsequently, the cavity 22 is completely filled with the resin under high pressure, until the RTM cavity 20 under the high internal pressure slightly opens. In this way, all fibers of the textile layers 6, 6a are completely embedded into the not yet set matrix of the resin. In addition, no free fiber ends of the textile layers 6, 6a are located outside the resin.

In the subsequent shaping process, full pressing pressure is applied to the RTM cavity 20 and maintained for a predetermined time. The additionally applied internal pressure corresponds to between several tenths and several hundredths of the initial pressure. The hardening time is, for example, between 7 minutes and 60 minutes depending on the employed resin.

A higher temperature may be selected to accelerate hardening.

The leaf spring 5 is then removed from the RTM cavity 20 and inserted, for example, into a tempering furnace. The leaf spring 5 may be fully hardened, for example, at temperatures from 120° C. to 130° C. The leaf spring may be machined after it has fully hardened.

Figure 4:
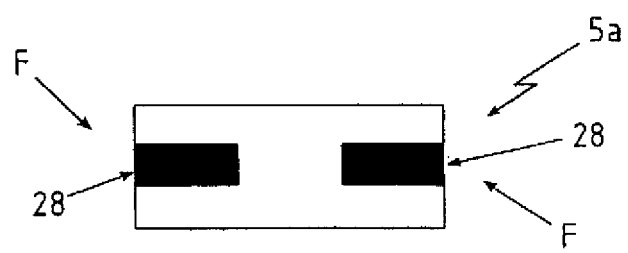
FIG. 4 shows in cross-section an embodiment of a fiber composite component according to the present invention.

FIG. 4 shows an embodiment of a leaf spring 5a in cross-section. The leaf spring 5a, which is formed in an unillustrated manner from the fibers of the textile layers 6, 6a and the duroplastic or thermoplastic resin surrounding the fibers, has reinforced regions 28 in their edge regions F.

The reinforced regions 28 of the leaf spring 5a are formed by high-strength fibers (not illustrated), for example by carbon fibers. This improves the lateral stiffness of the leaf spring 5a. The remaining fibers may be formed, for example, from glass fibers.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. A method of producing a leaf spring in form of a fiber composite component for a motor vehicle, comprising the steps of
applying a binder on a textile web,
cutting individual textile layers with the binder from the textile web,
layering fibers in form of at least two of the textile layers with the binder on top of one another, shaping the textile layers with the binder inside a mold tool and melting the binder, fixing the textile layers by cooling the melted binder so as to form a dry preform, separating a fiber composite blank from the preform by stamping, infiltrating the fiber composite blank with resin in an RTM (Resin Transfer Molding) cavity, and hardening the resin to produce the leaf spring of individual fibers and a matrix formed of the hardened resin surrounding the fibers.

2. The method of claim 1, wherein the binder is melted inside the mold tool by heating.

3. The method of claim 1, wherein the fiber composite blank is tempered inside the RTM cavity at locally different temperatures.

4. The method of claim 1, wherein the fiber component blank is actively cooled down after hardening the resin inside the RTM cavity.

5. The method of claim 1, wherein the fiber composite blank, after being infiltrated and hardened, is at least partially heated outside the RTM cavity by a heat source to a temperature of 80° to 200° C.

6. The method of claim 5, wherein the fiber composite blank is at least partially heated outside the RTM cavity to a temperature of 120° to 130° C.

7. The method of claim 1, wherein the fibers of the textile layers or the textile layers themselves are made from different materials.

8. The method of claim 1, wherein the resin is injected into the RTM cavity at a center of the RTM cavity.

9. The method of claim 1, wherein the hardening and cooling is performed at different temperatures.

* * * * *